United States Patent Office 3,376,340
Patented Apr. 2, 1968

3,376,340
SUBSTITUTED CARBOXANILIDES
Louis F. Cason, St. Paul, Minn., assignor to Tuskegee Institute, Tuskegee, Ala., a corporation of Alabama
No Drawing. Filed Nov. 23, 1965, Ser. No. 509,409
2 Claims. (Cl. 260—562)

This invention relates to compounds, more particularly chemical compounds represented as follows:

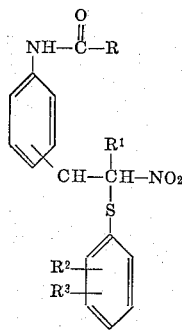

wherein R is a member selected from the group consisting of hydrogen and lower alkyl containing 1 to 3 carbon atoms, inclusive, $R^1$ is a member selected from the group consisting of hydrogen and methyl, and $R^2$ and $R^3$ are members selected from the group consisting of hydrogen and lower alkyl containing 1 to 4 carbon atoms, inclusive.

The compounds of the present invention can be made in three steps according to the following representation:

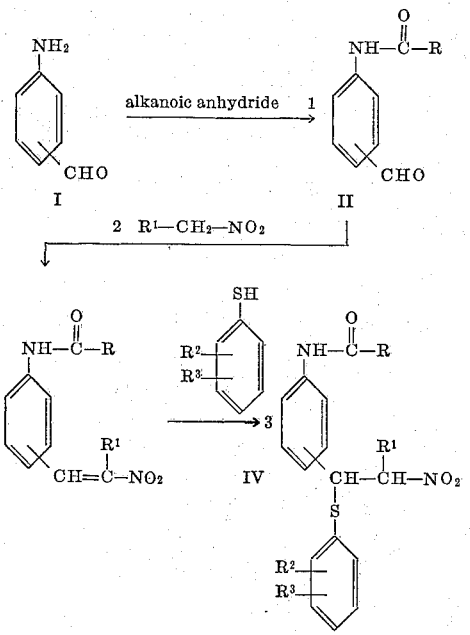

wherein R, $R^1$, $R^2$ and $R^3$ are as given above.

Generally described in accordance with the aforesaid representation, the respective aminobenzaldehyde (I), that is, 2-, 3-, or 4-aminobenzaldehyde, is reacted with the alkonoic anhydride, e.g., formic acetic anhydride, acetic anhydride, propionic anhydride, butyric anhydride, or isobutyric anhydride to yield the compounds represented by Formula II, that is, the corresponding alkanoamidobenzaldehydes. The respective alkano-amidobenzaldehyde is reacted with nitromethane or nitroethane to yield the corresponding alkanoamido-β-nitrostyrenes represented by Formula III. Thereafter the respective alkanoamido-β-nitrostyrene is reacted with the thiophenol, e.g., thiophenol, 2-methylthiophenol, 3-methylthiophenol, 4-methylthiophenol, 2-ethylthiophenol, 4-ethylthiophenol, 2-propylthiophenol, 4-isopropylthiophenol, 2-butylthiophenol, 2-sec.-butylthiophenol, 4-tert.-butylthiophenol, 2,3-dimethylthiophenol, 2,4-dimethylthiophenol, 3,5-dimethylthiophenol, 2-methyl-5-isopropylthiophenol, 3-butyl-5-ethylthiophenol, and the like, to yield the corresponding nitro sulfides represented by Formula IV.

The ortho, meta and para isomers of I are known, as are the alkanoic anhydrides used in preparing the alkanoamidobenzaldehydes of Formula II, of which representative members are known.

The alkanoamidobenzaldehydes are reacted with nitromethane or nitroethane according to known methods to provide the respective alkanoamido-β-nitrostyrenes of Formula III. See Worrall, Org. Syn., Coll. Vol. I, p. 413; also Schales et al., J.A.C.S. 74:4487 (1952), who describe the preparation of 4-acetamido-β-nitrostyrene and 4-acetamido-β-methyl-β-nitrostyrene.

The thiophenols, many of which are known, can be prepared in accordance with known procedures.

The nitro sulfides of Formula IV can be conveniently prepared in several ways, e.g., by the methods of Cason et al., J.A.C.S. 73:142 (1951).

Illustratively, equimolar quantities of the alkanoamido-β-nitrostyrene and the thiophenol are placed in a flask and warmed until all solid is melted. A basic catalyst (e.g., piperidine, morpholine, triethylamine or the like) is added dropwise, and after a slight exothermic reaction subsides, the reaction mixture is allowed to stand at about 20 to 50° C. until all material resolidifies. Recrystallization, e.g., from ethanol, provides a high degree of purity. Alternatively, equimolar amounts of the alkanoamido-β-nitrostyrene and the thiophenol are dissolved in an inert solvent, e.g., benzene, toluene, xylene or the like at room temperature. A basic catalyst of the kind noted above is added dropwise and the reaction mixture is allowed to stand for several hours, e.g., overnight, at about 20 to 30° C. The solvent is removed by distillation and the residue is recrystallized e.g. from ethanol. Ethanol can replace the aromatic hydrocarbon as the inert reaction medium in which case the reaction can proceed at temperatures ranging from about 20° C. to the reflux temperature. Ordinarily a product of good purity crystallizes directly from solution.

The compounds of the present invention demonstrate beneficial antimicrobial activity. For example minimum inhibitory concentrations of 4'-[2-nitro-1-(p-tolylthio)-ethyl]-acetanilide are as follows:

| Organism: | Mg./ml. |
|---|---|
| S. aureus | 1 |
| S. haemolyticus | 0.1 |
| B. subtilis | 1 |
| M. avium | 0.1 |
| E. coli | 1 |
| A. aerogenes | 1 |
| S. typhosa | 1 |
| P. aeruginosa | 1 |
| K. pneumoniae | 1 |
| P. vulgaris | 1 |
| S. schottmuelleri | 1 |
| S. paradysenteriae | 1 |

The $LD_{50}$ is relatively high 563 mg./kg. upon intraperitoneal injection to mice.

The compounds of the present invention are also useful as chemical intermediates. For example they can be reduced by chemical means such as stannous chloride and hydrochloric acid or zinc and acetic acid or by catalytic hydrogenation in the presence of a hydrogenation catalyst such as platinum or Raney nickel (Cason et al., supra), to obtain amines having the formula:

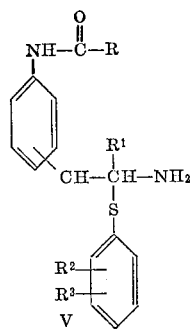

wherein R, R¹, R² and R³ are as given above.

The compounds of Formula V form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155. They also form salts with trichloroacetic acid which are useful as herbicides, for example, against Johnson grass, yellow foxtail, green foxtail, Bermuda grass, and quackgrass.

The following preparations and examples illustrate the process and products of the present invention but are not to be construed as limiting.

PREPARATION 1

4-acetamido-β-nitrostyrene

Materials:

| | | |
|---|---|---|
| Nitromethane (1.0 mole) | gm | 61 |
| 4-acetamidobenzaldehyde (1.0 mole) | gm | 163.2 |
| Sodium hydroxide, pellets (1.05 moles) | gm | 42 |
| Methanol | ml | 700 |
| Hydrochloric acid, concentrated | ml | 200 |

Procedure (1) To a 2-l., 3-neck, round-bottom flask equipped with stirrer, thermometer, addition funnel and acetone-ice bath, add the nitromethane, 4-acetamidobenzaldehyde and methanol.

(2) Cool to −3° C.

(3) Cautiously ad a 1-ml. portion of a cold (0° C.) solution of sodium hydroxide (42 gm. in 100 ml. of water) and stir 30 minutes. Continue the addition cautiously over a 4-hour period while holding the temperature at 10 to 15° C.

(4) Refrigerate the reaction mixture at 5 to 10° C. overnight.

(5) Add 700 ml. of ice water dropwise while holding the temperature below 15° C. by means of external cooling.

(6) Pour this solution cautiously into a cold solution of 200 ml. of concentrated hydrochloric acid and 300 ml. of water with good stirring and cooling.

(7) Filter the resultant yellow precipitate, wash the cake well with water and dry in the vacuum oven at 40° C. under nitrogen. Yield, 145 gm. of 4-acetamido-β-nitrosyrene which can be used in the next step without further purification.

Example 1.—4'[2-nitro-1-(p-tolylthio)-ethyl]-acetanilide

Materials:

| | | |
|---|---|---|
| 4-acetamido-β-nitrosyrene (0.603 mole) | gm | 124 |
| 4-methylthiophenol (0.603 mole) | gm | 74.6 |
| Triethylamine | ml | 12 |
| Ethanol, absolute | l | 3 |

Procedure (1) To a 5-l., large-neck, round-bottom flask equipped with stirrer, thermometer and reflux condenser with drying tube, add the 4-acetamido-β-nitrostyrene, 4-methylthiophenol, absolute ethanol, and triethylamine.

(2) Stir this suspension for one hour at room temperature.

(3) Filter the resultant white precipitate, rinse with cold absolute ethanol, and pull damp dry.

(4) Recrystallize the dry material from absolute ethanol.

Yield: 125 gm.
M.P.: 161–164° C.
C: 62.05, 61.87% (theory 61.80%)
H: 5.58, 5.50% (theory 5.49%)
N: 8.68% (theory 8.48%)
S: 10.02% (theory 9.72%)
U.V. (EtOH):
$\lambda_{251}\epsilon = 22{,}100$
$\lambda_{352}\epsilon = 4{,}850$ Example 2

2-aminobenzaldehyde and 3-aminobenzaldehyde are reacted with acetic anhydride to obtain 2-acetamidobenzaldehyde and 3-acetamidobenzaldehyde, respectively.

Following the procedure of Prepartion 1, but substituting 2-acetamidobenzaldehyde and 3-acetamidobenzaldehyde for 4-acetamidobenzaldehyde, there are obtained 2-acetamido-β-nitro-styrene and 3-acetamido-β-nitrostyrene, respectively.

Following the procedure of Example 1, but substituting 2-acetamido-β-nitrostyrene and 3-acetamido-β-nitrostyrene for 4-acetamido-β-nitrostyrene, there are obtained 2'-[2-nitro-1-(p-tolylthio)ethyl]acetanilide and 3'-[2-nitro-1-(p-tolylthio)ethyl]acetanilide, respectively.

Example 3

Following the procedure of Example 1, but substituting 4-acetamido-β-methyl-β-nitrosyrene (Schales et al., supra) for 4-acetamido-β-nitrostyrene, 4'-[2-nitro-1-(p-tolylthio)propyl]acetanilide is obtained.

Following the foregoing procedure, but also substituting thiophenol and 2-butylthiophenol for 4-methylthiophenol, there are obtained 4'-[2-nitro-1-(phenylthio)propyl]acetanilide and 4'-[2-nitro-1-(4-butylphenylthio)propyl]acetanilide, respectively.

Example 4

Following the procedure of Example 1, but substituting thiophenol, 2-methylthiophenol, 3-methylthiophenol, 2-ethylthiophenol, 4-ethylthiophenol, 2-propylthiophenol, 4-isopropylthiophenol, 2-butylthiophenol, 2-sec.-butylthiophenol, 4-tert.-butylthiophenol, 2,3-dimethylthiophenol, 2,4-dimethylthiophenol, 3,5-dimethylthiophenol, 2-methyl-5-isopropylthiophenol, and 3-butyl-5-ethylthiophenol for 4-methylthiophenol, there are obtained 4'-[2-nitro-1-(phenylthio)ethyl]acetanilide,
4'-[2-nitro-1-(o-tolylthio)ethyl]acetanilide,
4'-[2-nitro-1-(m-tolylthio)ethyl]acetanilide,
4'-[2-nitro-1-(2-ethylphenylthio)ethyl]acetanilide,
4'-[2-nitro-1-(4-ethylphenylthio)ethyl]acetanilide,
4'-[2-nitro-1-(2-propylphenylthio)ethyl]acetanilide,
4'-[2-nitro-1-(4-isopropylphenylthio)ethyl]acetanilide,
4'-[2-nitro-1-(2-butylphenylthio)ethyl]acetanilide,
4'-[2-nitro-1-(2-sec.butylphenylthio)ethyl]acetanilide,
4'-[2-nitro-1-(4-tert.butylphenylthio)ethyl]acetanilide,
4'-[2-nitro-1-(2,3-dimethylphenylthio)ethyl]acetanilide,
4'-[2-nitro-1-(2,4-dimethylphenylthio)ethyl]acetanilide,
4'-[2-nitro-1-(3,5-dimethylphenylthio)ethyl]acetanilide,
4'-[2-nitro-1-(2-methyl-5-isopropylphenylthio)ethyl]-acetanilide, and
4'-[2-nitro-1-(3-butyl-5-ethylphenylthio)ethyl]-acetanilide, respectively.

Example 5

4-aminobenzaldehyde is reacted with formic acetic anhydride, propionic anhydride, butyric anhydride, and isobutyric anhydride to obtain 4-formamidobenzaldehyde, 4-propionamidobenzaldehyde, 4-butyramidobenzaldehyde, and 4-isobutyramidobenzaldehyde, respectively.

Following the procedure of Preparation 1, but substituting 4-formamidobenzaldehyde, 4-propionamidobenzaldehyde, 4-butyramidobenzaldehyde, and 4-isobutyramidobenzaldehyde for 4-acetamidobenzaldehyde, there are obtained 4-formamido-β-nitrostyrene,
4-propionamido-β-nitrostyrene,
4-butyramido-β-nitrostyrene, and
4-isobutyramido-β-nitrostyrene, respectively.

Following the procedure of Example 1, but substituting 4-formamido-β-nitrostyrene, 4-propionamido-β-nitrostyrene, 4-butyramido-β-nitrostyrene, and 4-isobutyramido-β-nitrostyrene for 4-acetamido-β-nitrostyrene, there are obtained 4′-[2-nitro-1-(p-tolylthio)ethyl]formanilide,
4′-[2-nitro-1-(p-tolylthio)ethyl]propionanilide,
4′-[2-nitro-1-(p-tolylthio)ethyl]butyranilide, and
4′-[2-nitro-1-(p-tolylthio)ethyl]isobutyranilide,
respectively.

Example 6

Following the procedure of Example 1, but substituting 4-formamido-β-nitrostyrene for 4-acetamido-β-nitrostyrene and also substituting thiophenol for 4-methylthiophenol, 4′-[2-nitro-1-(phenylthio)ethyl]formanilide is obtained.

What is claimed is:
1. A compound of the formula:

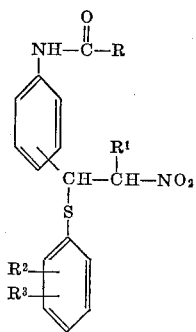

wherein R is a member selected from the group consisting of hydrogen and lower alkyl containing 1 to 3 carbon atoms inclusive, $R^1$ is a member selected from the group consisting of hydrogen and methyl, and $R^2$ and $R^3$ are members selected from the group consisting of hydrogen and lower alkyl containing 1 to 4 carbon atoms inclusive.

2. 4′-[2-nitro-1-(p-tolylthio)ethyl]acetanilide.

References Cited
UNITED STATES PATENTS 2,901,508   8/1959   Korman _____ 260—562

JOHN D. RANDOLPH, *Primary Examiner.*

H. I. MOATZ, *Assistant Examiner.*